US012311398B2

(12) United States Patent
Smolinski et al.

(10) Patent No.: US 12,311,398 B2
(45) Date of Patent: May 27, 2025

(54) PULSE WIDTH MODULATING SPRAYING SYSTEM

(71) Applicant: Spraying Systems Co., Wheaton, IL (US)

(72) Inventors: Kyle Peter Smolinski, Wheaton, IL (US); Samuel Alexander Reinhart, Wheaton, IL (US); Weston John Thompson, Wheaton, IL (US); Andrew John Day, North Aurora, IL (US); Timothy H. Hennessy, Plainfield, IL (US); Robert J. Adams, St. Charles, IL (US)

(73) Assignee: Spraying Systems, Wheaton, IL (US)

( * ) Notice: Subject to any disclaimer, the term of this patent is extended or adjusted under 35 U.S.C. 154(b) by 546 days.

(21) Appl. No.: 17/697,622

(22) Filed: Mar. 17, 2022

(65) Prior Publication Data

US 2022/0297141 A1 Sep. 22, 2022

Related U.S. Application Data

(60) Provisional application No. 63/162,882, filed on Mar. 18, 2021.

(51) Int. Cl.
*B05B 5/04* (2006.01)
*B05B 5/00* (2006.01)
(Continued)

(52) U.S. Cl.
CPC ................ *B05B 5/04* (2013.01); *B05B 5/007* (2013.01); *B05B 12/06* (2013.01); *B05B 13/0278* (2013.01)

(58) Field of Classification Search
CPC ........... B05B 5/04; B05B 5/007; B05B 12/06; B05B 13/0278
(Continued)

(56) References Cited

U.S. PATENT DOCUMENTS 4,368,852 A * 1/1983 Sharp ........................ B05B 5/16 137/505.39
4,946,107 A * 8/1990 Hunt .................. F02M 51/0667 239/585.4

(Continued)

FOREIGN PATENT DOCUMENTS

CH 421 009 A 9/1966
DE 19 49 449 A1 4/1971

(Continued)

OTHER PUBLICATIONS

DE19810753 English by Google (Year: 1999).*

(Continued)

*Primary Examiner* — Chee-Chong Lee
(74) *Attorney, Agent, or Firm* — Leydig, Voit & Mayer, Ltd.

(57) ABSTRACT

A liquid spraying system having an electrically operated pulse width modulation control for directing a modulated liquid discharge based upon frequency and duty cycle of a reciprocally operated liquid control valve. The spray nozzle assembly includes a nozzle body having an inwardly converging conical chamber communicating between an upstream liquid directing plate and a downstream liquid discharge passage. The liquid directing plate is formed with a one or more rings of circumferentially spaced liquid directing passages angularly oriented with respect to a central liquid flow axis of the nozzle body for directing liquid discharging from said nozzle body discharge passage into a predetermined conical spray pattern.

20 Claims, 8 Drawing Sheets

(51) Int. Cl.
*B05B 12/06* (2006.01)
*B05B 13/02* (2006.01)

(58) Field of Classification Search
USPC .......................................................... 239/697
See application file for complete search history.

(56) References Cited

U.S. PATENT DOCUMENTS

| | | | | |
|---|---|---|---|---|
| 4,988,015 | A * | 1/1991 | Price | B05B 13/0431 222/1 |
| 5,294,057 | A * | 3/1994 | Hamilton | B05B 1/3053 118/317 |
| 7,086,613 | B2 * | 8/2006 | Hennessy | B05B 1/3053 239/417.5 |
| 2010/0014378 | A1 | 1/2010 | Strahmann | |

FOREIGN PATENT DOCUMENTS

| | | | | |
|---|---|---|---|---|
| DE | 19810753 | * | 9/1999 | B01F 5/06 |
| FR | 1 221 814 | A | 6/1960 | |
| JP | S55 16888 | U | 2/1980 | |
| WO | WO 2012/021708 | A1 | 2/2012 | |

OTHER PUBLICATIONS

International Bureau, International Search Report in International Application No. PCT/US2022/020769, mailed Jun. 7, 2022.

International Bureau, International Preliminary Report on Patentability in International Application No. PCT/US2022/020769, mailed Sep. 28, 2023.

* cited by examiner

PULSE WIDTH MODULATING SPRAYING SYSTEM

This patent application claims the benefit of U.S. Provisional Patent Application No. 62/162,882, filed on Mar. 18, 2021, which is incorporated by reference.

FIELD OF THE INVENTION

The present invention relates to pulse width modulating spraying systems, and more particularly, to spray nozzles for use with such spraying systems in producing conical spray patterns.

BACKGROUND OF THE INVENTION

In many spray applications, there are benefits to adjusting the flow rate to optimize performance based on process feedback. One way to control flow rate during a process is to connect the fluid feed to a rapidly operating solenoid valve that can be cycled at frequencies of 1 Hz and faster. The frequency is the number of valve cycles per minute. This is variable by the system controller. The amount of time the valve is open during each cycle is called the duty cycle and is typically represented as percentage of full flow. If the pulsating flow control valve is fully open during the complete cycle, then this is referred to as a 100% duty cycle. If the control valve is open for only half of the complete cycle, this is referred to as a 50% duty cycle. For certain processes, variable duty cycles can be supplied to the control valve from an operating control for achieving the appropriate application rate based on changes in processing speed, desired application for particular products, different moisture levels, and other variables. Varying the frequency and duty cycle can also be used to reduce and/or eliminate dripping from the nozzle when pulsed.

To properly direct liquid from the control valve, spray nozzles are used to control the flow rate and create an appropriate spray pattern. The most common spray nozzle used with pulse width modulating spraying systems are flat fan spray tips. Such nozzle design allows for rapid spray formation, good flow rate control, and rapid spray collapse with minimal dripping when the control is turned off. There are times when a full or hollow cone spray pattern would be better suited for particular applications, but currently available spray nozzles have not functioned well with pulse width modulating flow control systems in producing desired conical spray patterns.

When using current conical spray nozzle designs in pulse width modulating spraying systems, the spray performance can be significantly affected by the fast on/off cycling of the valve. Instead of an expected conical spray pattern with a given spray angle and flow rate, such as when operated at 100% duty cycle, the spray angle can be greatly reduced and fails to deliver the desired full cone or other conical spray coverage or distribution. While the flow rate desirably also should be reduced in controlled relation to the duty cycle supplied the valve, current conical spray nozzles with pulse width modulation further have been unreliable in that regard.

OBJECTS AND SUMMARY OF THE INVENTION

It is an object of the present invention to provide a pulse width modulating spraying system operable for directing controlled conical spray patterns at variable pulsing operating conditions.

Another object is to provide a pulse width modulating spraying system as characterized above in which the flow rate can be predictably controlled in relation to the duty cycle of the pulse width modulation.

A further object is to provide a pulse width modulating spraying system of the above kind that is operable for reliably generating desired full cone spray patterns at variable duty cycles.

Yet another object is to provide a pulse width modulating spraying system of the foregoing type that is operable for reliably generating hollow cone spray patterns at variable duty cycles.

Still another object is to provide a plurality of interchangeable spray nozzle designs adapted for producing controlled full or hollow cone conical spray patterns.

Another object is to provide a spray nozzle that prevents dripping when used in pulsating operating conditions.

A further object is to provide such spray nozzles that are relatively simple in design and easily adaptable for use in pulse width modulating spraying systems.

Still another object is to provide a nozzle that produces the same performance as standard full cone or hollow cone tip with or without pulsing and can be used in non-pulsating applications.

Other objects and advantages of the invention will become apparent upon reading the following detailed description and upon references to the drawings, in which:

Figure 1:
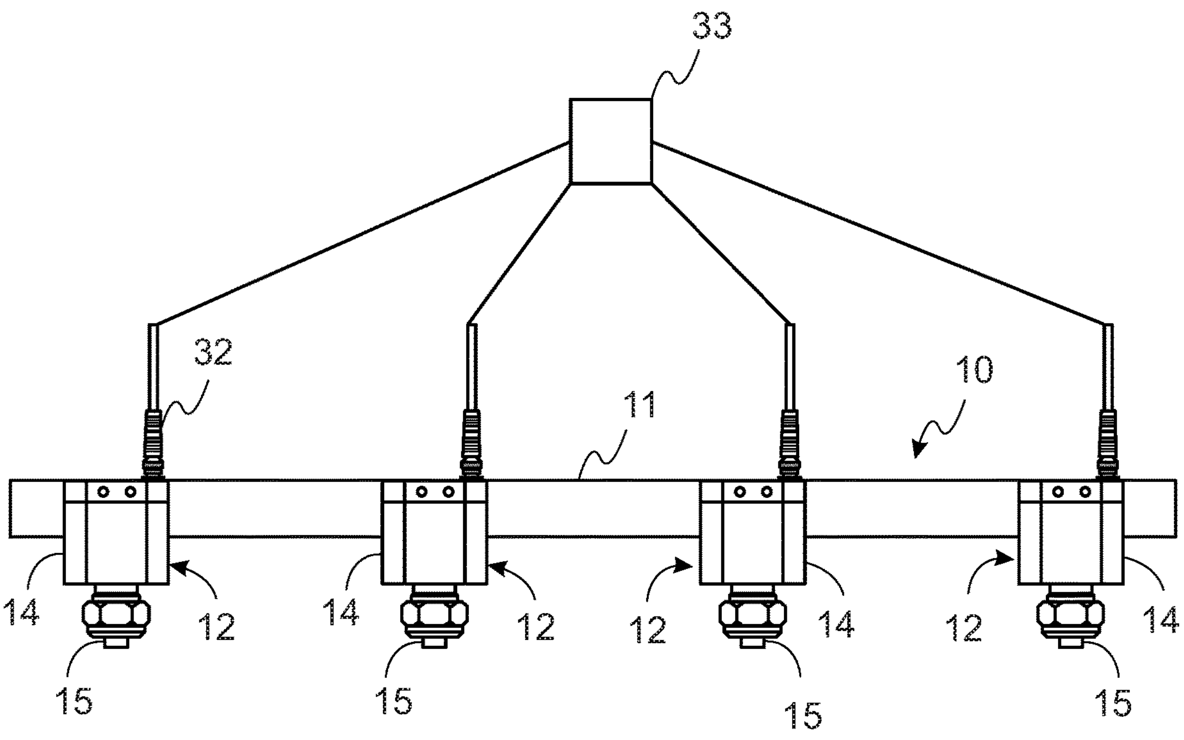
FIG. 1 is a side elevational view of a liquid supply header having a plurality of laterally spaced pulse width modulating spraying devices or systems in accordance with the invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DESCRIPTION OF THE PREFERRED EMBODIMENTS

Figure 2:
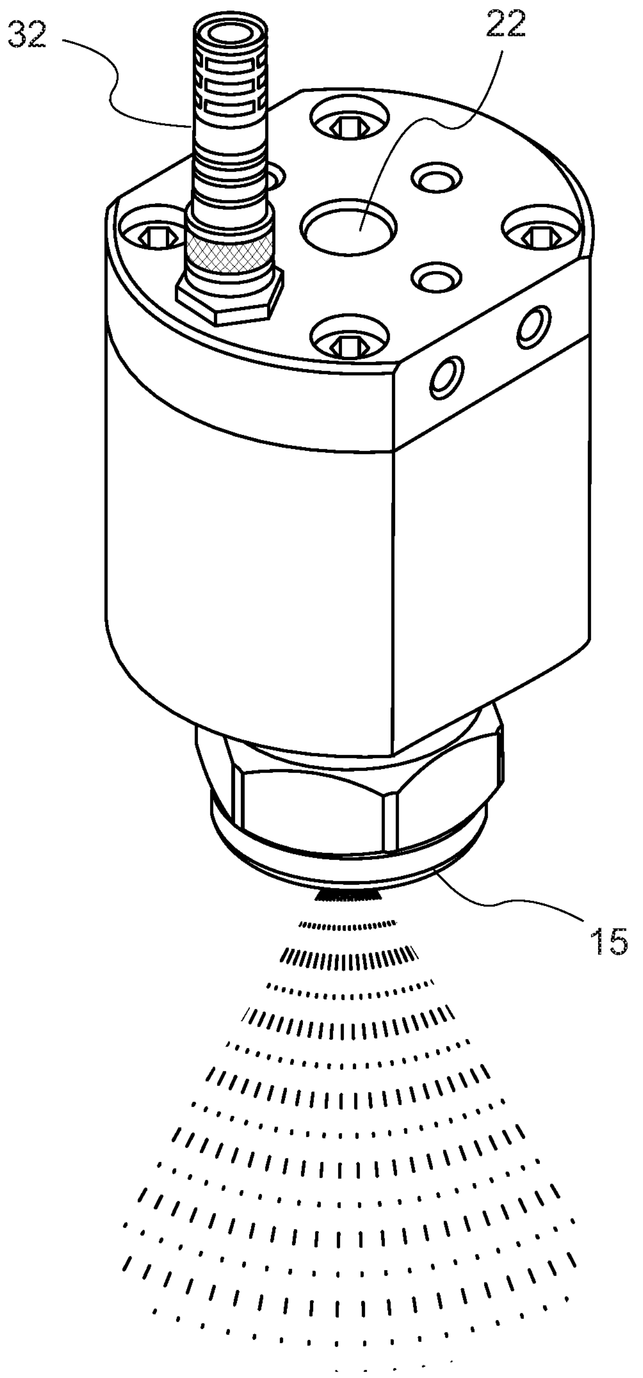
FIG. 2 is an enlarged perspective of one of pulse width modulating spray systems shown in FIG. 1 depicting the conical liquid spray discharge.
Figure 3:
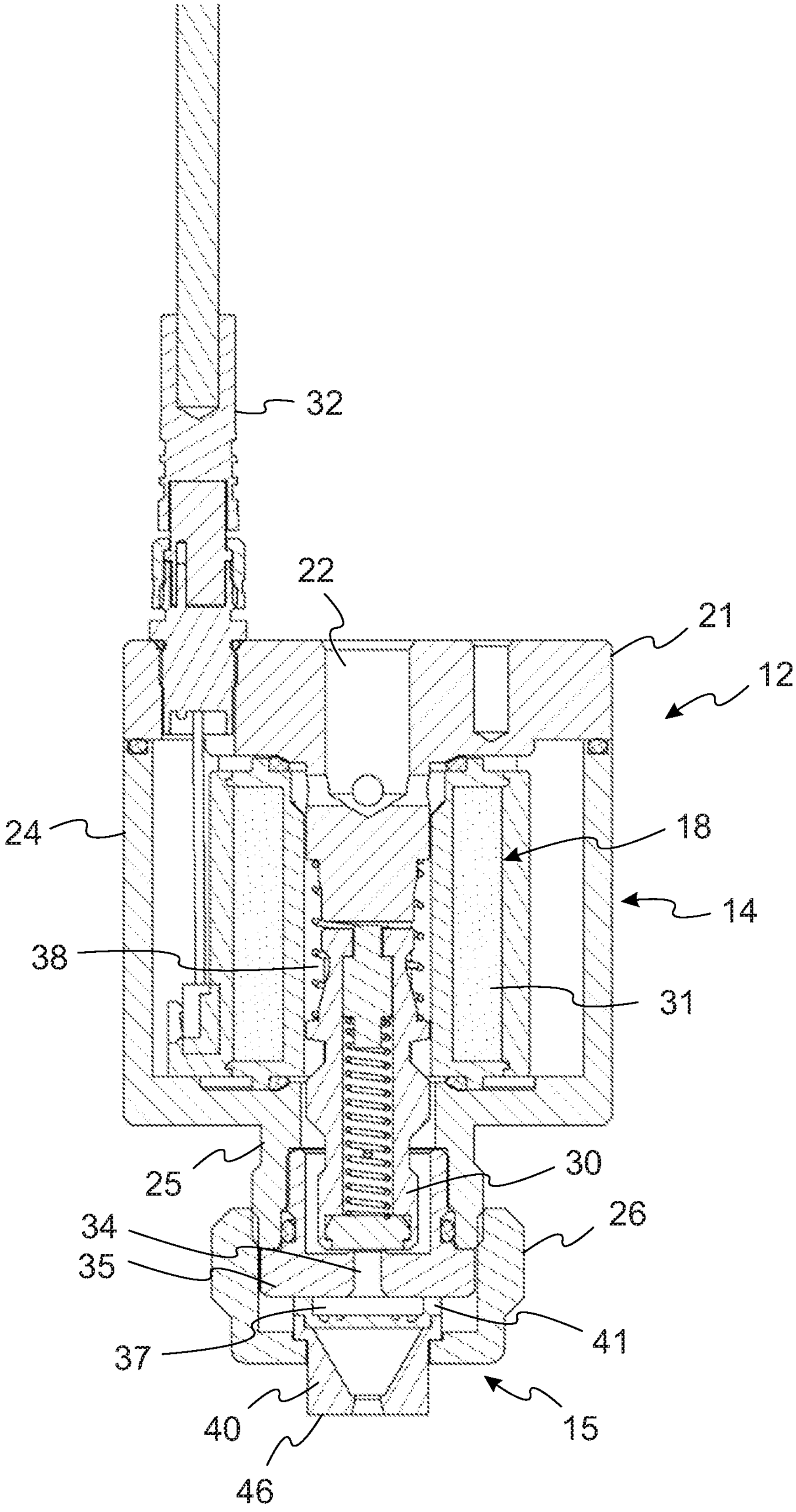
FIG. 3 is an enlarged vertical section of the pulse width modulating spraying system shown in FIG. 2 with the valve thereof in a closed position.
Figure 4:
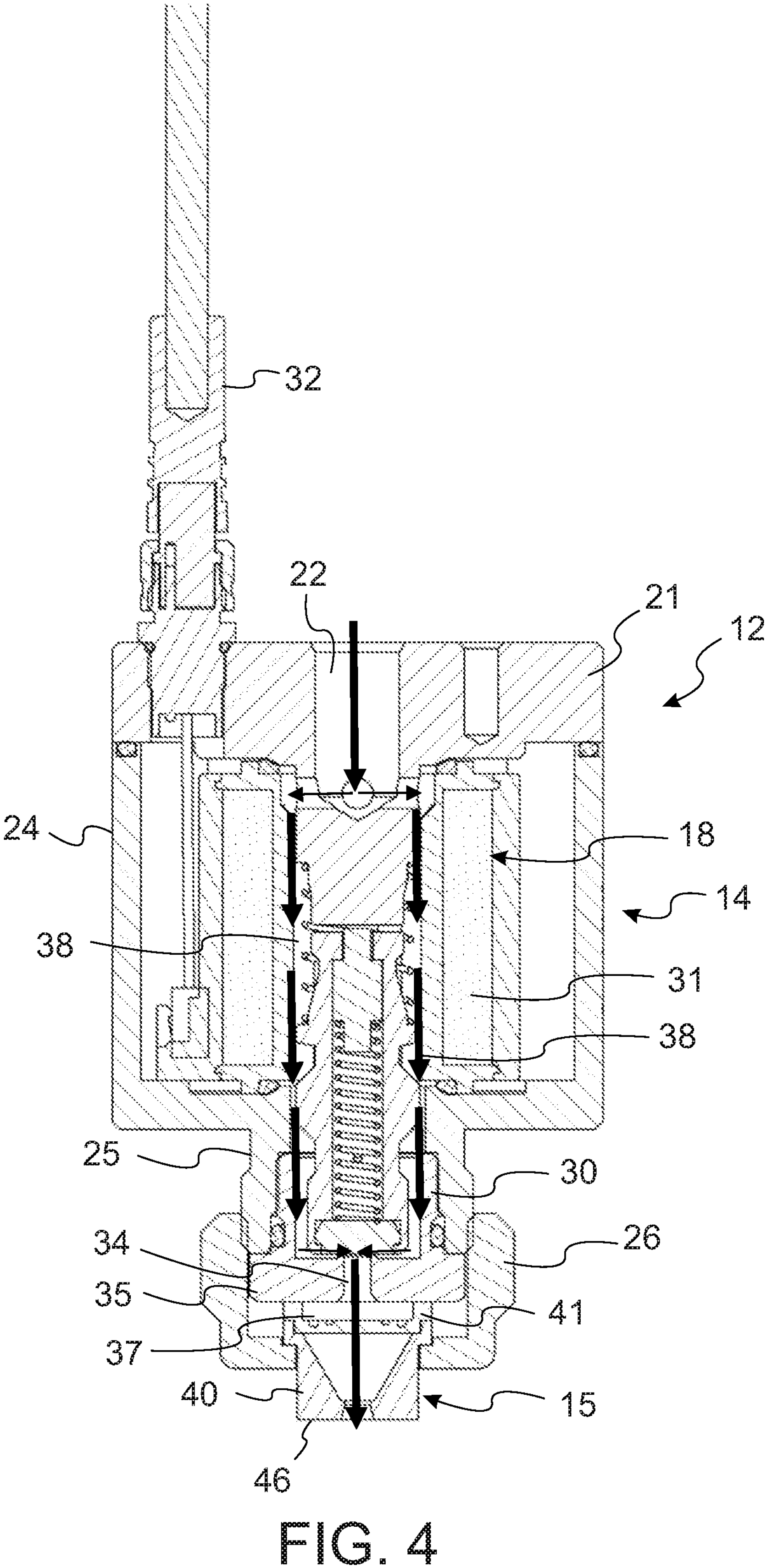
FIG. 4 is an enlarged vertical section of the illustrated pulse width modulating spraying system with the valve in an open position, and displaying the liquid flow path through the system.
Figure 4A:
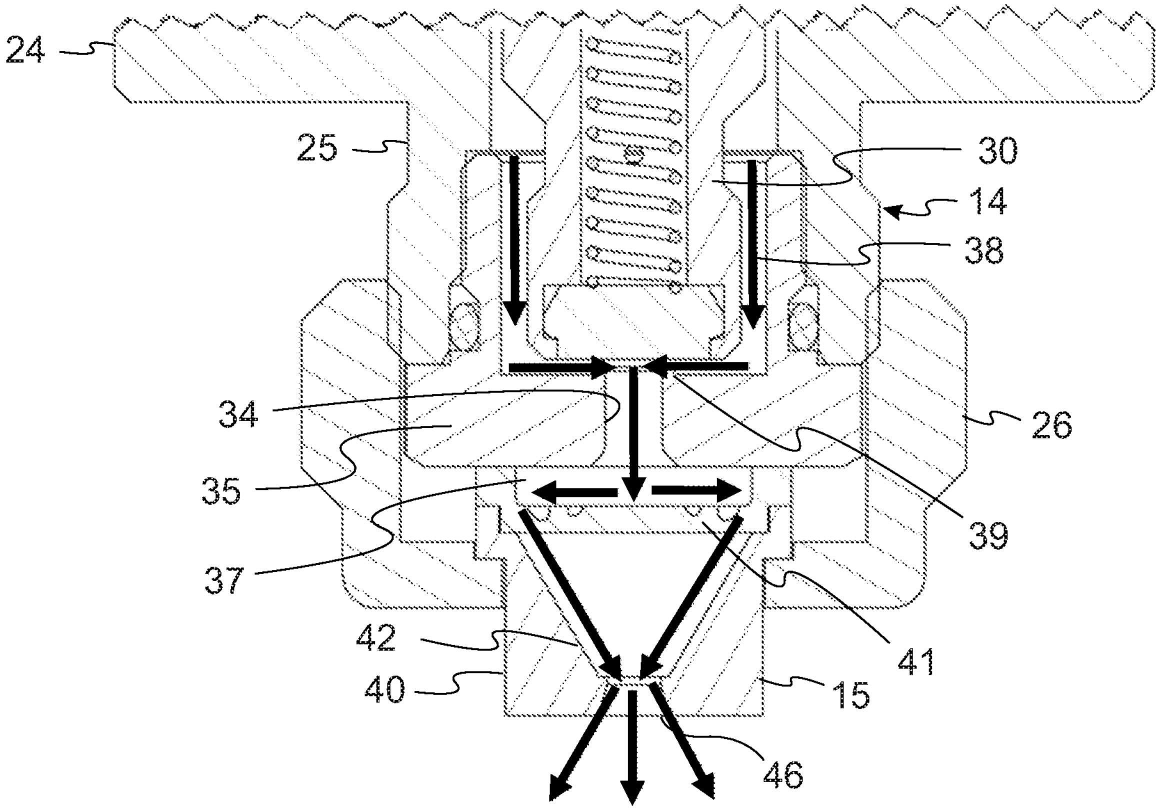
FIG. 4A is an enlarged vertical section of the downstream discharge end of the pulse width modulating spraying system shown in FIG. 4, again depicting the liquid flow path through the system.

Referring now more particularly to the drawings, there is shown an illustrative spray boom 10 having a liquid supply conduit 11 for supplying liquid to a plurality of pulse width modulating spraying systems 12 in accordance with the invention mounted in spaced relation along the liquid supply conduit 11. The pulse width modulating spraying systems 12, as depicted in FIGS. 2-4, each comprise a pulse width modulation assembly 14 and a spray nozzle assembly 15

The pulse width modulation assembly 14 is configured to allow the spray nozzle assembly 15 to achieve a pulsing flow that rapidly alternates between on and off flow conditions. To that end, the pulse width modulation assembly 14 includes an electrically actuated on/off solenoid valve 18 that can oscillate rapidly between an open position in which fluid is allowed to pass to the spray nozzle assembly 15 and a closed position in which the flow of fluid to the spray nozzle assembly 15 is blocked. The pulse width modulation assembly 14 may be of a commercially known type such as offered by Spraying Systems Co., assignee of the present application, under the trademark PulsaJet. Various components and their mode of operation of the illustrated pulse width modulation assembly may be similar to those described in U.S. Pat. No. 7,086,613, the disclosure of which is incorporated herein by reference.

The illustrated pulse width modulation assembly 14 includes an inlet housing 21 having a liquid inlet port 22 for coupling to a liquid supply and a downstream outer housing body 24 that includes a forwardly extending annular end 25 upon which the nozzle assembly 15 is mounted and retained by a threaded retainer cap 26. The solenoid valve 18 of the illustrated pulse width modulation assembly 14 includes spring biased plunger 30 operated by a solenoid coil 31 electrically controlled by a data input cable 32 coupled to an appropriate control 33 for reciprocating movement between raised and lowered positions that open and close an outlet port 34 of a housing end plate 35 fixed to the lower end annular extension 25 and which communicates with the spray nozzle assembly 15. When the plunger 30 is in a raised open position, a liquid flow stream communicates from the upstream liquid inlet port 22, along a flow passage 38 about the plunger 30 and through the outlet port 34 of the end plate 35 which in this case has a raised annular plunger seat 39 about the outlet port 34. As indicated above, the use of the pulse width modulation assembly 14 allows the flow rate to the spray nozzle assembly 15 to be adjusted without changing the pressure of the fluid supply simply by adjusting the on/off frequency and duty cycle of the pulse width modulation assembly 14.

Figure 5:
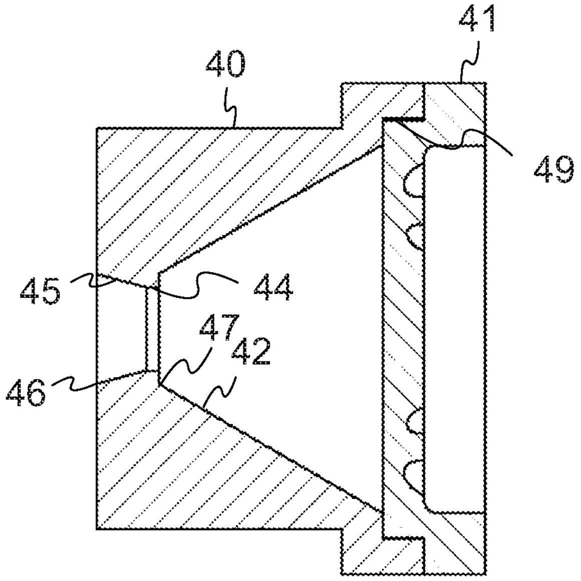
FIG. 5 is an enlarged vertical section of the spray nozzle assembly of the illustrated spraying system for producing a full cone spray pattern.
Figure 5A:
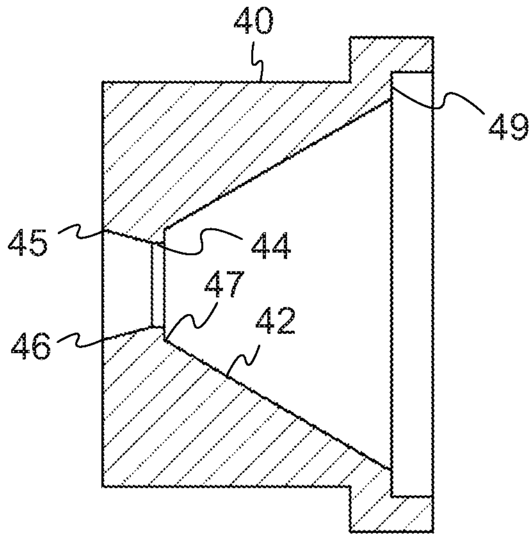
FIG. 5A is a vertical section of the nozzle body of the illustrated spray nozzle assembly.
Figure 6:
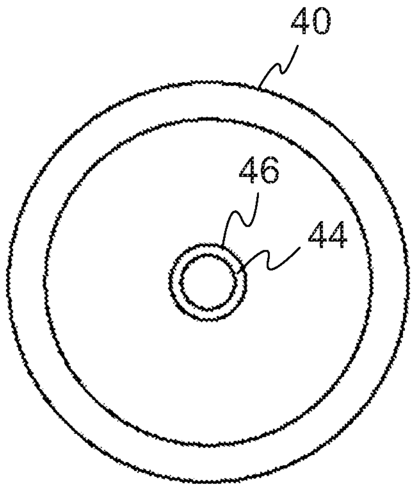
FIG. 6 is a downstream end view of the spray nozzle assembly shown in FIG. 5.
Figure 7:
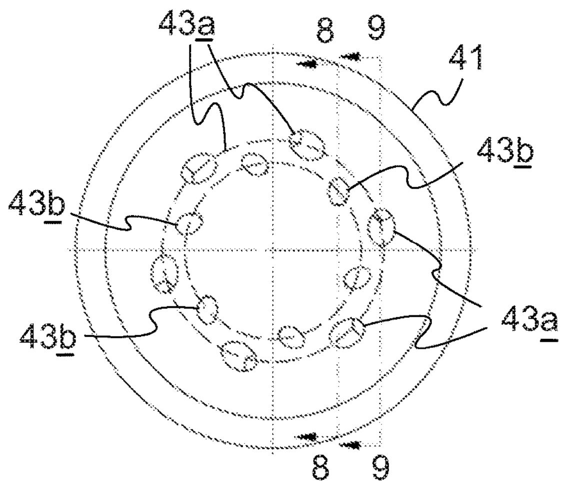
FIG. 7 is an upstream view of the inlet plate of the spray nozzle assembly shown in FIG. 5.
Figure 7A:
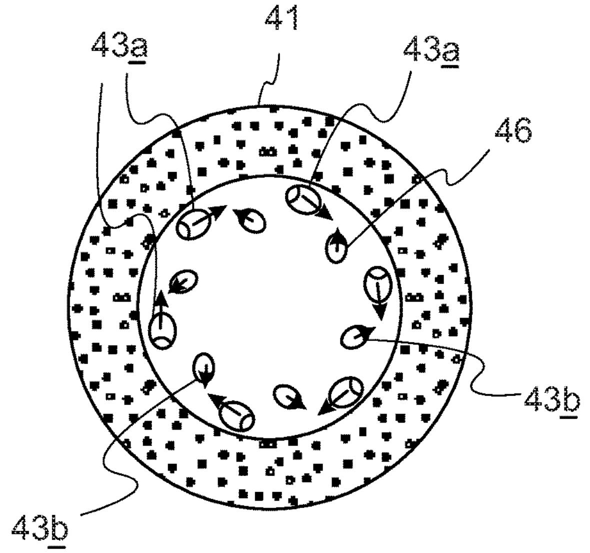
FIG. 7A is a downstream view of the inlet plate of the illustrated spray nozzle assembly, depicting the liquid flow discharge.
Figure 8:
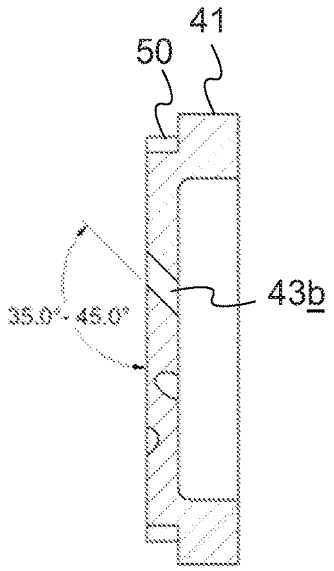
FIGS. 8 and 9 are vertical sections of the inlet plate taken in the planes of lines 8-8 and 9-9 respectively in FIG. 7.
Figure 9:
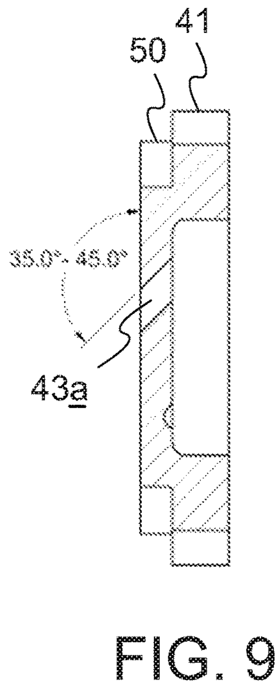

In accordance with an important aspect of the present embodiment, the spray nozzle assembly 15 of the pulse width modulating spraying system 14 is effective for generating controlled conical spray discharges over a wide range of pulse modulating operating conditions. The illustrated spray nozzle assemblies 15, as depicted in FIGS. 3-8 each comprise a two part assembly including a nozzle body 40 and an upstream inlet orifice plate 41. The nozzle body 40 defines an inwardly converging conical chamber 42 that communicates with a short length cylindrical outlet passage section 44 that transitions to an outwardly angled conical section 45 that defines a downstream discharge orifice 46 (FIG. 5). The conical chamber 42 in this case is tapered inwardly at an angle of about 60 degrees and terminates with a transverse annular turbulence inducing ledge 47 about the inlet of the outlet passage 44. The illustrated nozzle body 40 has an upstream counterbore 49 that receives and locates a reduced diameter downstream cylindrical mounting end 50 of the upstream inlet orifice plate 41. The illustrated housing end plate 35 and upstream inlet orifice plate 41 define a narrow width expansion chamber 37 between the end plate 35 and the spray nozzle assembly 15 into which the pulse width modulated discharge is directed. The expansion chamber 37 in this case is defined in an upstream side of inlet orifice plate 41 and has an axial length less than one third of the diameter of expansion chamber 37.

In carrying out this embodiment, the upstream inlet orifice plate 41 may be designed for effecting a full cone or hollow cone spray discharge from the nozzle body discharge orifice 46. The upstream inlet orifice plate 41, as depicted in FIGS. 5-9, is effective for generating a full cone spray pattern. To this end, the upstream inlet orifice plate 41 is formed with two concentric rings of circumferentially liquid directing passages **43*a*, 43*b* with the liquid directing passages 43*a* of one ring oriented at an opposing flow direction to the liquid directing passages 43*b* of the other ring of passages. The liquid directing passages 43*a* in the outer ring in this case are tangentially oriented with respect to the circumference of the outer ring at acute angles, preferably between 35 and 45 degrees to the flow axis 48 of the nozzle body 40, for directing liquid in a clockwise direction, as viewed in FIG. 7. The liquid directing passages 43*b* in the inner ring, on the other hand, are tangentially oriented in an opposite direction, again preferably between about 35 and 45 degrees to the flow axis 48 of the nozzle body 40, and are smaller in diameter than the outer ring for directing liquid in an opposite counterclockwise direction, as viewed in FIG. 7, for filling in the conical spray pattern. It has been unexpectedly found that such dual circumferential arrangement of such oppositely directed liquid passages 43*a*, 43*b* both generate rotation in the discharging liquid spray into conical form while further forming the spray pattern into a controlled full cone discharge. It further has been found that such arrangement of liquid directing passages 43*a*, 43*b* eliminates drippage from the spray nozzle assembly 15 during on and off pulses of the spraying system since there is no straight path through the nozzle assembly 15 to the discharge orifice 46**.

Figure 10:
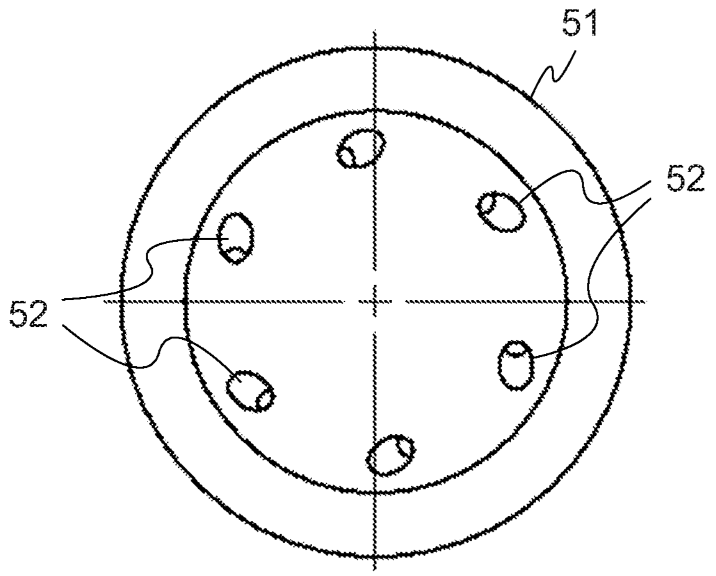
FIG. 10 is a downstream end view of an alternative embodiment of liquid inlet plate for use in directing a hollow cone spray.
Figure 11:
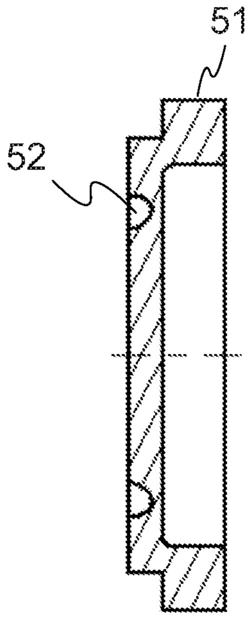
FIG. 11 is a vertical section of the inlet plate shown in FIG. 10.

In keeping with this further feature of the present embodiment, the spraying systems may be easily converted for discharging and directing a hollow cone spray pattern by using different combinations of an upstream inlet orifice plate and body, such as in FIGS. 10 and 11. A single circular ring of angled liquid directing passages 52 in this case angled in a common direction, again between 35 and 45 degrees to the central flow axis of the nozzle, imparts a swirling movement to the discharging liquid spray and forms it with a hollow internal core. It will be appreciated that the upstream inlet orifice plates 41 and 51 can be designed for interchangeable replacement in the nozzle body for particular spray applications. The angled liquid directing passages in both the full cone and hollow cone spray applications have been found to eliminate dripping from the nozzle during on and off pulsation of the solenoid. The exit orifice 46 of the nozzle body may also be sized larger for hollow cone spraying in particular applications.

From the foregoing, it can be seen that a pulse width modulating spraying system is provided that is operable for directing controlled conical spray patterns at various pulsating rates of operation. The spraying system includes a spray nozzle assembly having a liquid directing orifice plate that can be interchangeable for directing full cone or hollow cone spray patterns at variable operating conditions. The spray nozzle assemblies furthermore, are relatively simple in design and easily adapted for use with pulse width modulating spraying systems.

The invention claimed is:

1. A liquid spraying system comprising:

a housing having a liquid inlet for connection to a pressurized liquid supply and a downstream liquid outlet;

an electrically operated pulse width modulation control having a valve reciprocally moveable with respect to said liquid outlet for controlling the direction of a modulated liquid discharge from said liquid outlet based upon frequency and duty cycle of valve movement;

a spray nozzle assembly mounted downstream of said liquid outlet comprising a nozzle body and an upstream liquid directing plate;

said nozzle body defining a conical chamber converging inwardly in a downstream direction that communicates with a discharge passage of said nozzle body;

said liquid directing plate being formed with at least one ring of circumferentially spaced liquid directing passages about a central flow axis of the nozzle body angularly oriented with respect to the central flow axis for directing pulse width modulated liquid from said housing liquid outlet into said nozzle body conical chamber for discharge from the nozzle body discharge passage in a conical spray pattern.

2. The liquid spraying system of claim 1 in which said liquid directing passages of said liquid directing plate comprise a single ring of liquid directing passages angled in a common angular direction to the nozzle body central flow axis for imparting swirling movement to liquid discharging from said nozzle body discharge passage in a hollow cone spray pattern.

3. The liquid spraying system of claim 1 in which said liquid directing passages of said liquid directing plate comprise two concentric rings of liquid directing passages with one of the rings being oriented in one angular direction to the central flow axis of the nozzle body and the other concentric ring of liquid directing passages being angularly oriented in a direction opposite to that of the liquid directing passages of the first ring for imparting swirling movement to liquid discharging from said nozzle body discharge passage in a full cone spray pattern.

4. The liquid spraying system of claim 3 in which said concentric rings of liquid directing passages comprise an inner ring and an outer ring disposed radially outwardly of the inner ring, said inner ring of liquid directing passages being smaller in diameter than the liquid directing passages of the outer ring.

5. The liquid spraying system of claim 3 in which the liquid directing passages of each ring are tangentially oriented with respect to a circumference of the respective ring.

6. The liquid spraying system of claim 5 in which the liquid directing passages of each ring are oriented at acute angles between 35° and 45° to the central flow axis of the nozzle body.

7. The liquid spraying system of claim 1 in which said nozzle body discharge passage has an outwardly angled conical section that defines a discharge orifice of said nozzle body.

8. The liquid spray system of claim 1 in which said nozzle body discharge passage includes a cylindrical passage section that transitions to an outwardly angled conical section that defines a discharge orifice of the nozzle body.

9. The liquid spray assembly of claim 8 in which said nozzle body inwardly converging conical chamber terminates in an annular transverse turbulence inducing ledge at an upstream end of said outwardly angled conical section.

10. The liquid spraying system of claim 1 in which said housing liquid outlet is defined in an end plate of said housing, and said end plate and said liquid directing plate defining an expansion chamber between said end plate and liquid directing plate into which modulating liquid discharge from said housing liquid outlet is directed.

11. The liquid spraying system of claim 10 in which said expansion chamber has an axial length less than one third a diameter of said expansion chamber.

12. The liquid spraying system of claim 10 in which said spray nozzle assembly liquid directing plate is disposed in recess relation to an upstream end of said nozzle body and said expansion chamber is defined within an upstream side of said liquid directing plate.

13. The liquid spraying system of claim 12 in which said spray nozzle assembly is releasably secured to said end plate by a threaded cap fixed to said housing.

14. A liquid spraying system comprising:

a housing having a liquid inlet for connection to a pressurized liquid supply and a downstream liquid outlet;

an electrically operated pulse width modulation control having a valve reciprocally moveable with respect to said liquid outlet for controlling the direction of a modulated liquid discharge from said liquid outlet based upon frequency and duty cycle of valve movement;

a spray nozzle assembly mounted downstream of said liquid outlet comprising a nozzle body and an upstream liquid directing plate;

said nozzle body defining a conical chamber converging inwardly in a downstream direction that communicates with a discharge passage of said nozzle body;

said housing liquid outlet being defined in an end plate of said housing, said end plate and said liquid directing plate defining said expansion chamber between said end plate and said liquid directing plate into which a modulated liquid discharge from said housing liquid outlet is directed;

said liquid directing plate being formed with at least one ring of circumferentially spaced liquid directing passages about a central flow axis of the nozzle body, said liquid directing passages each being angularly oriented at an acute angle between 35° and 45° to the central flow axis of said nozzle body for directing pulse width modulated liquid from said housing liquid outlet and expansion chamber into said nozzle body conical chamber for discharge from the nozzle body discharge passage in a conical spray pattern.

15. The liquid spraying system of claim 14 in which said liquid directing passages of said liquid directing plate comprise a single ring of liquid directing passages angled in a common angular direction to the nozzle body central flow axis for imparting swirling movement to liquid discharging from said nozzle body discharge passage in a hollow cone spray pattern.

16. The liquid spraying system of claim 14 in which said liquid directing passages of said liquid directing plate comprise two concentric rings of liquid directing passages with one of the rings being oriented in one angular direction to the central flow axis of the nozzle body and the other concentric ring of liquid directing passages being angularly oriented in a direction opposite to that of the liquid directing passages of the first ring for imparting swirling movement to liquid discharging from said nozzle body discharge passage in a full cone spray pattern.

17. The liquid spraying system of claim 16 in which said concentric rings of liquid directing passages comprise an inner ring and an outer ring disposed radially outwardly of the inner ring, said inner ring of liquid directing passages being smaller in diameter than the liquid directing passages of the outer ring.

18. The liquid spraying system of claim 16 in which the liquid directing passages of each ring are tangentially oriented with respect to a circumference of the respective ring.

19. The liquid spraying system of claim 14 in which said nozzle body discharge passage includes a cylindrical passages section that transitions to an outwardly angled conical section that defines a discharge orifice of the nozzle body.

20. The liquid spraying system of claim 19 in which said nozzle body inwardly converging conical chamber terminates in an annular transverse turbulence inducing ledge at an upstream end of said outwardly angled conical section.

* * * * *